United States Patent [19]

Pamplin, Jr.

[11] 3,997,441
[45] Dec. 14, 1976

[54] PRESSURE FILTER SEPARATOR

[76] Inventor: Lee F. Pamplin, Jr., 1601 Sweet Apple Court, Birmingham, Ala. 35243

[22] Filed: Apr. 21, 1975

[21] Appl. No.: 569,875

[52] U.S. Cl. .............................. 210/75; 209/258; 210/79; 210/193; 210/415; 210/458
[51] Int. Cl.² ........................................ B01D 37/02
[58] Field of Search .......... 209/258, 273, 300, 306, 209/389; 210/75, 79, 193, 232, 238, 360 A, 360 R, 413, 415, 457, 458

[56] References Cited
UNITED STATES PATENTS

| | | | |
|---|---|---|---|
| 3,574,098 | 4/1971 | Boorujy | 210/75 X |
| 3,953,325 | 4/1976 | Nelson | 209/273 |

Primary Examiner—Charles N. Hart
Assistant Examiner—R. G. Mukai
Attorney, Agent, or Firm—Frederick L. Bergert

[57] ABSTRACT

Apparatus and method for providing continuous pressure filter separation are disclosed. The apparatus includes a chamber with a pair of perforated cylindrical sleeves having filter media and precoat material disposed therebetween. A rotatable wiper blade assembly mounted on a first hollow shaft is longitudinally disposed within the central portion of the chamber. Filtered solid materials are removed through one or more slots in the first hollow shaft which intermittently align with prealigned slots in a pair of concentric hollow shafts mounted within the first hollow shaft.

8 Claims, 9 Drawing Figures

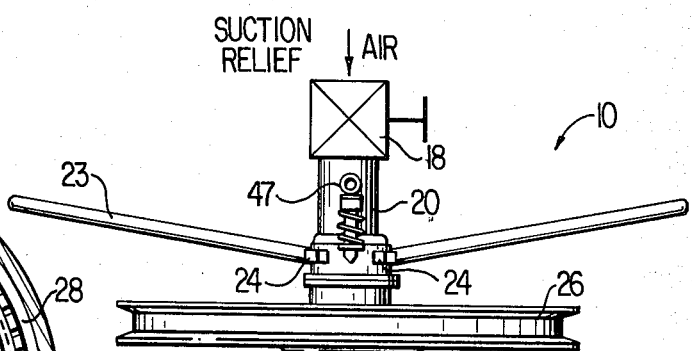
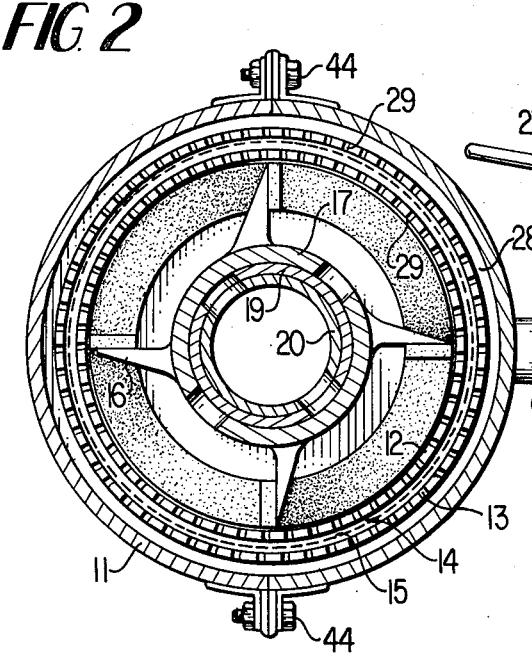
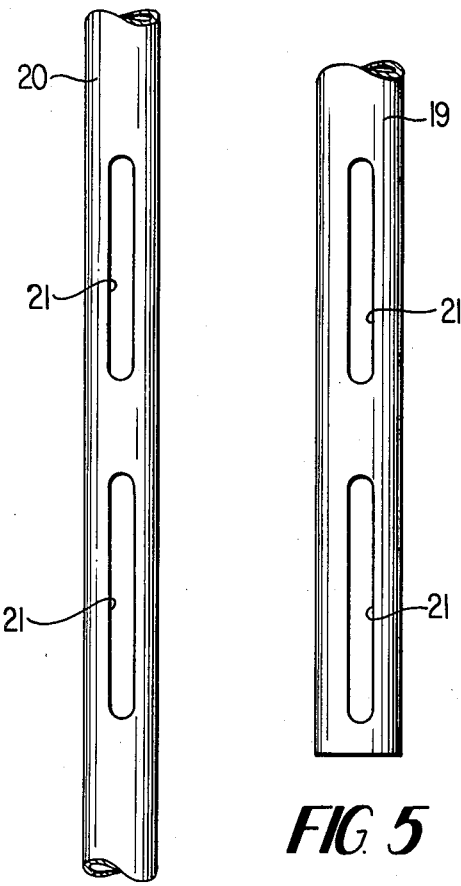
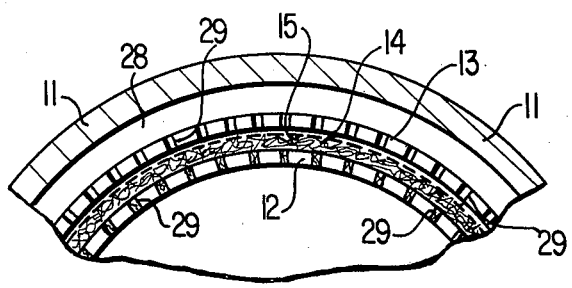

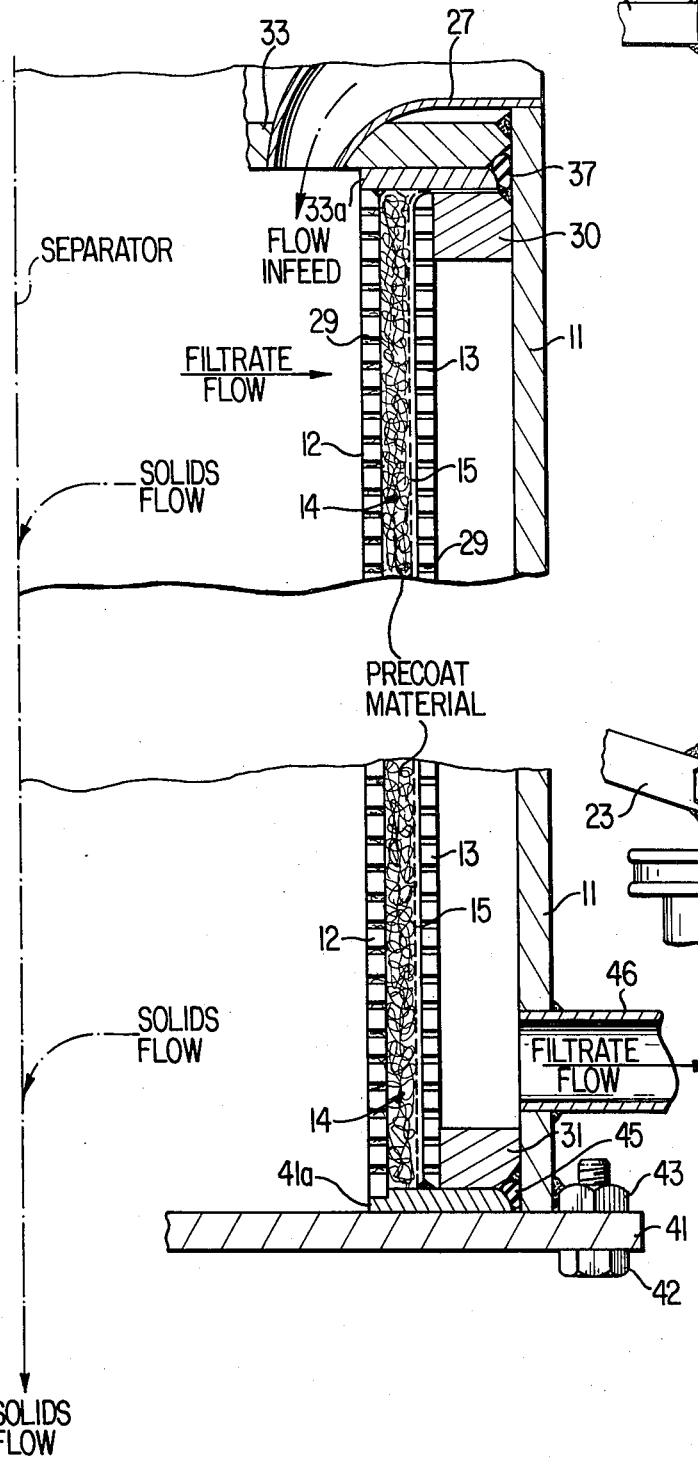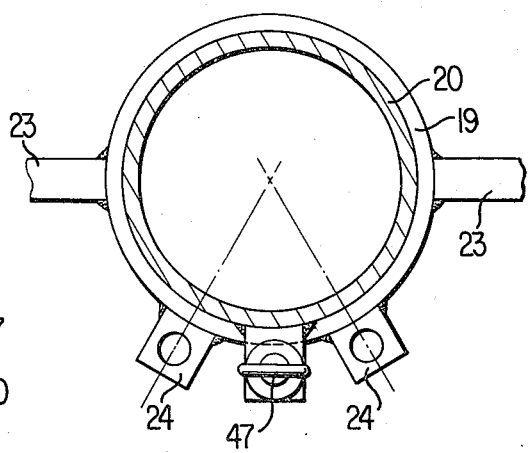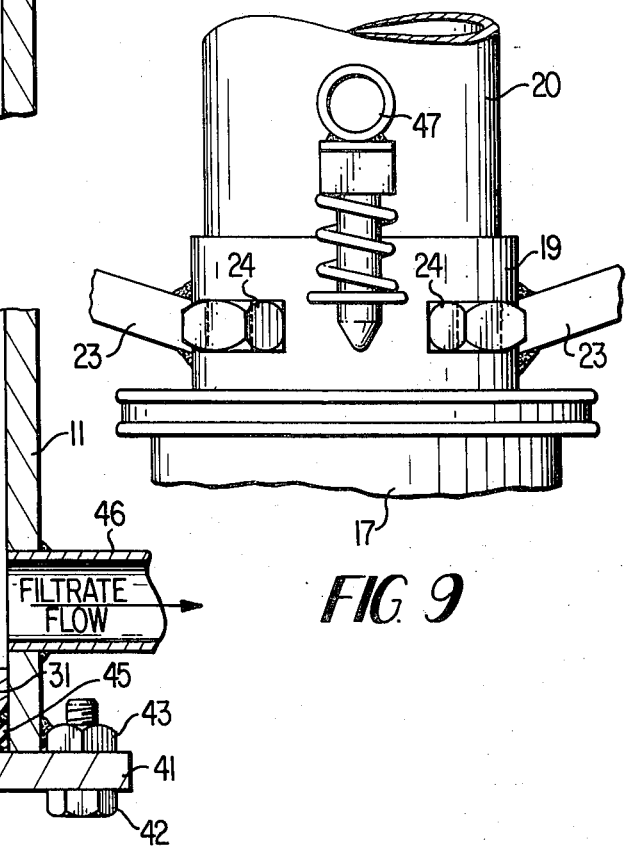

PRESSURE FILTER SEPARATOR

BACKGROUND AND SUMMARY OF THE INVENTION

The present invention relates to a pressure filter separator. More particularly, the present invention relates to a continuous operation liquid-solids pressure filter separator for use in filtering or dewatering any of various liquid-solids materials to remove the solid components.

Previous internal pressure precoat filters or rotary vacuum filters have typically been constructed in the form of cylinders or cones, in which the filter revolves around an axis, often with cutting blades to cut away precoat and sludge formed inside the cylinder or cone as the precoat becomes impregnated or clogged by filtered solids or sludge. In such prior art filters, the internal pressure which can be applied is limited, due to such clogging, thus increasing the time required to filter a given volume of feed material. Typical of conventional liquid filters of either the pressure, vacuum or free flow type, are those described, for example, in U.S. Pat. Nos. 3,491,889, 3,731,814, 3,322,283, 3,188,942, 3,250,703, 1,212,844, 3,501,004, 2,125,532, 3,762,563 and 3,379,312. A typical backwash filter of the prior art is described in U.S. Pat. No. 3,574,509.

By the present invention, there is provided a pressure filter separator or dewatering device which is constructed so as to provide continuous operation, and which has been found to overcome the above-mentioned disadvantages associated with filtering devices of the prior art.

The pressure filter separator of the present invention is constructed as a cylindrical chamber having a coaxially mounted rotatable wiper blade assembly. A pair of perforated cylinders are mounted outwardly of the wiper blade assembly within the separator in a spaced relationship so as to create therebetween a chamber for filter media and precoat material. A filer media is positioned adjacent the inner surface of the outer perforated cylinder within the chamber created by the inner and outer perforated cylinders. A volume of precoat material introduced into the separator device under the application of either high or low pressure vacuum is trapped or collected on this filter media. The liquid and solids-containing feed material to be filtered or separated is then introduced into the separator under the continued application of pressure or vacuum and passes in sequence through (1) the inner perforated cylinder, (2) the trapped precoat material, (3) the filter media, and finally through (4) the outer perforated cylinder, after which the filtrate collects in an outer collection chamber for subsequent removal. The blades of the wiper assembly could feasibly touch the surface of the inner perforated sleeve, however to prevent wear on the surface of the sleeve and the outer edge of the wiper blades there will be a preferred clearance of 1/64 to 1/16 inch between the wiper blades and the surface of the inner perforated sleeve. The constant movement of the wiper blades in close proximity to the surface of the inner perforated sleeve maintains the inner surface of said sleeve free of solid material except for the slight residue of 1/64 to 1/16 inch which will not appreciably impede the passage of filtrate through the perforated sleeve into the precoat chamber.

At no time do the rotating wiper blades make contact with either the filter media or the precoat material which has been trapped by the filter media, so that there is possibility of wiping or "blinding" of the filter media. Also, due to the fact that the filtering process is constant, there is no necessity for a backwash procedure. The combination of the pressure applied to the feed material and the action of the rotating wiper blades forces the sludge or filtered solids to the center of the separator, where such solid material is removed by a valve shaft arrangement which includes three concentric shafts constructed of hollow piping. Valve action is provided by controlling, through pre-determined positioning, the relative location of vertical and spiral slots cut into the three shafts.

A primary advantage of the present invention resides in the fact that higher filtration pressures may be employed than is possible with conventional filter devices, thus substantially reducing the time required to filter a given volume. In addition, dewatered solids or sludge may be removed at varied rates and compositions as desired, by operation of the concentric valve shaft arrangement of the present invention. As used herein, the term "sludge" includes typically a suspension of solids in a liquid such as water.

BRIEF DESCRIPTION OF THE DRAWINGS

The advantages and features of the pressure filter separator of the present invention will be better understood from the following description of the preferred embodiments, taken in conjunction with the accompanying drawings, wherein:

FIG. 2 is a cross-sectional view taken along line 2—2 of FIG. 1;

FIG. 3 is an exterior view of the separator of FIG. 1 showing external components, partly in schematic;

FIG. 4 is a cut-away portion of the view shown in FIG. 2, enlarged to show detail;

FIGS. 5 and 6 are perspective views of the valve bearing shaft and central solids discharge shaft, respectively, employed in the present separator;

FIG. 7 is an enlarged elevation in cross-section of a portion of the separator shown in FIG. 1;

FIG. 8 is a plan view in partial cross-section of the valve lock configuration employed in the present separator; and FIG. 9 is an elevational view of the valve lock configuration shown in FIG. 8.

DESCRIPTION OF THE PREFERRED EMBODIMENTS

Figure 1:
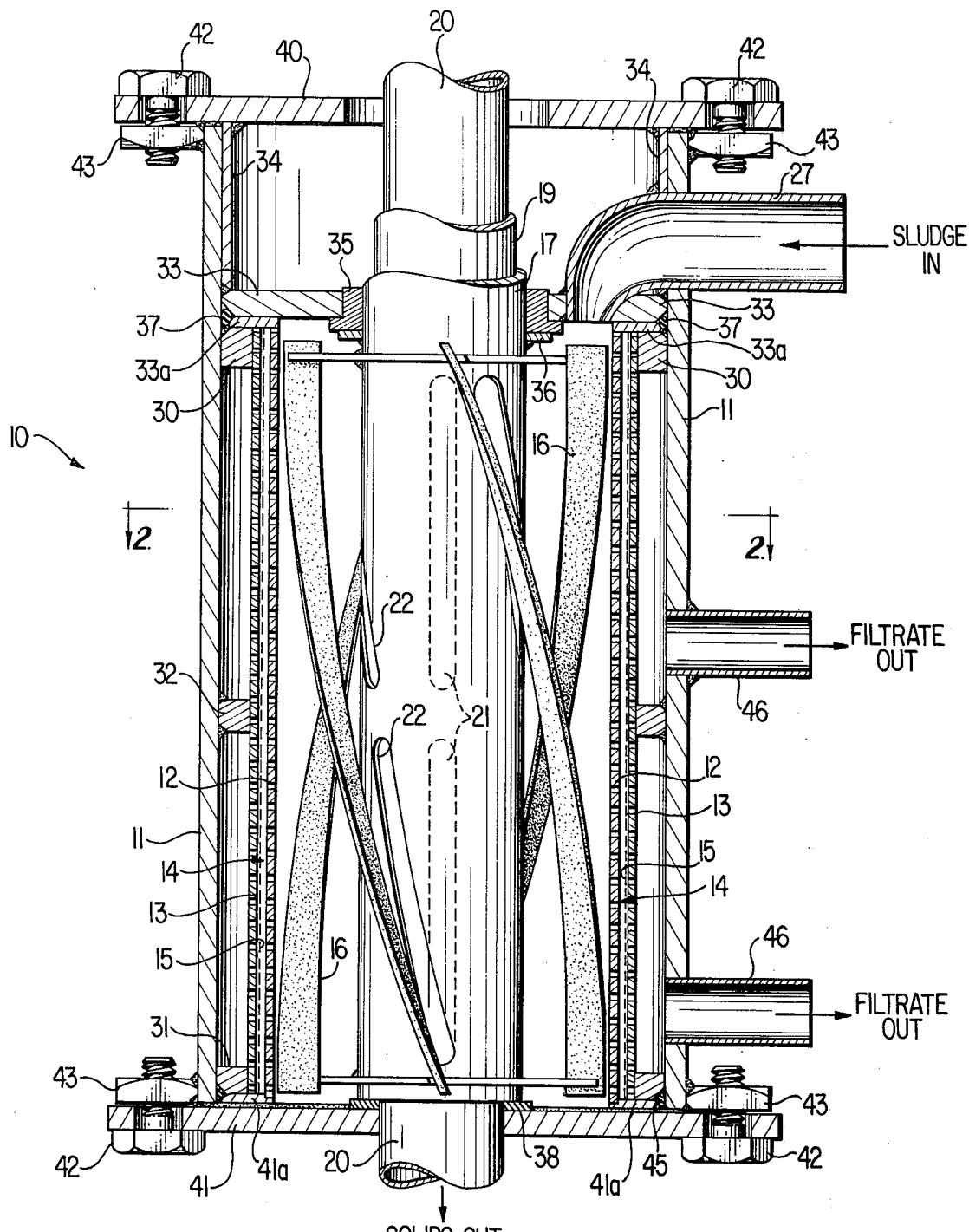
FIG. 1 is an elevational view in partial cross-section of the interior of a pressure filter separator according to the present invention.

In the embodiment of the present invention as shown in FIGS. 1 through 9, there is provided a filter separator apparatus 10 which includes a pressure resistant outer cylindrical tank or shell 11 which houses inner 12 and outer 13 cylindrical perforated sleeves. The shell 11 is constructed of semi-cylindrical members which are bolted together in a conventional manner by bolt assemblies 44. The sleeves 12, 13 are mounted coaxially within the shell 11 and are arranged in a spaced relationship so as to create a chamber 14 between the sleeves 12, 13. The outer sleeve 13 is retained in position by an upper 30 and lower 31 retaining ring and an internal retaining ring 32 which are welded or otherwise suitably secured to the inner surface of the shell 11. Additional internal rings 32 may be employed as necessary. An outer head plate 40 and tail plate 41 extend across the upper and lower ends of the shell 11, respectively. The plates 40, 41 are secured to the shell 11 by means of bolts 42 which are threadedly received in lugs 43 welded to the outer surface of the shell 11.

An inner head plate 33 is located above sleeves 12, 13, the plate 33 being attached at its outer edge to the interior of the shell 11 and also to an inner reinforcing shell 34 which is secured to and extends around the inner periphery of the shell 11 between plates 33 and 40. A thin retainer ring 33a is positioned between head plate 33 and retainer ring 30, as shown in detail in FIG. 7. At its outer edge, ring 33a abuts an O-ring 37 which is positioned so as to seal the area of contact between plate 33 and retaining rings 30, 33a with the inner wall of shell 11.

Ring 33a is welded or otherwise attached in a continuous manner to the top of sleeve 12 and serves to maintain the upper end of the sleeve 12 in position within the shell 11. The lower end of the sleeve 12 is positioned in a notch cut into a thin retainer ring 41a which rests on plate 41 and which is welded to the interior bottom of outer sleeve 13. Pressure exerted by bolts 42 in lugs 43 also assists in maintaining the sleeves 12, 13 in position. O-ring 45 provides a seal for the area of contact between rings 31, 41a, plate 41 and the inner wall of shell 11. During installation, outer sleeve 13 and ring 41a are installed within the shell 11 prior to installation of inner sleeve 12 and ring 33a.

A filter media material 15 is attached by any suitable securing means such as an adhesive material to the entire inner surface of the outer perforated sleeve 13, as shown in FIG. 4. The filter media 15 may be in the form of a filter screen, filter cloth or other similar form and constructed of a material such as wire, cloth, paper, a synthetic material such as nylon or the like. The term "filter media" as employed herein is intended to include all such filtering means. The filter media must be constructed so that the openings therein will be small enough to prevent precoat material, to be described hereinafter, from passing through the openings. The particular type of filter media to be used will be determined by the type of precoat employed, and the type of precoat, in turn, will be determined by the type of sludge to be treated.

In attaching the filter media 15 to the sleeve 13, a space or clearance must be maintained between the filter media 15 and the inner sleeve 12 to allow for collection of precoat material which is fed into the central portion of the apparatus 10 and trapped on the filter media 15. This space is usually from about 1/64 to 1 inch in width and extends around the entire circumference of the filter media 15 and inner sleeve 12. The perforations 29 in the sleeves 12, 13 are shown as being aligned, but such alignment is not necessary for proper operation, due to the presence of the filter media 15 and precoat chamber 14. The size of these perforations 29 will depend upon the type sludge being treated, but will usually be from about 1/32 to 1/16 inch in diameter, although perforations 29 as large as 3/16 inch in diameter may be employed.

A wiper blade assembly 16 which includes one or more rotatable wiper blades is coaxially mounted within the shell 11 on a hollow shaft 17. The number of wiper blades will generally vary with the diameter of the blade unit 16. A small unit may employ only one blade. Blades will usually, however, be employed in multiples of two for purposes of balance and to provide equal loading. The factors to be considered in determining the number of blades include (1) the speed of rotation of the blade unit and (2) the number of times per minute that the interior wall of sleeve 12 must be wiped to accommodate the particular sludge being treated. The blades may be constructed of a metal such as steel, an alloy, plastic or other suitable material. The outer edges of the blades should be of a diameter such that the blades will rotate freely inside sleeve 12. Thus, a clearance of about 1/64 to 1/16 inch is desirably maintained between the outer edges of the blades 16 and the interior surface of sleeve 12 so as to prevent wear on wiper blade edges and the inner surface of sleeve 12, as before described.

The upper portion of the shaft 17 extends through inner head plate 33. The shaft 17 is mounted for rotation within the plate 33 by means of a bearing 35 and retaining ring 36 assembly. The lower end of the shaft 17 rests on a bearing 38 mounted on the tail plate 41. The shaft 17 is connected at its upper end to a drive pulley 26 on the exterior of the shell 11, as shown in FIG. 3, for operation by a conventional power source (not shown) to cause rotation of the wiper blades 16.

A tubular valve bearing shaft 19 is positioned inside the wiper-blade shaft 17 and a tubular central solids discharge shaft 20 is positioned within the valve bearing shaft 19, as shown in FIGS. 1 and 2. The shafts 19, 20 are provided with vertical slots 21 which operate in interrelation with spiral slots 22 in the wiper blade shaft 17 to create a valve action, as described hereinafter. Details of the shafts 19, 20 are shown in FIGS. 5 and 6. A relief valve 18 is located at the upper end of the shaft 19. This valve 18 functions as a relief mechanism when vacuum is applied through the discharge valve 25, to be described hereinafter, as an aid to extrusion of solids. The relief valve 18 also controls pressure to prevent damage to internal parts of the pressure filter separator 10.

The wiper blades 16 are shown in FIG. 1 as being of the spiral reel type. Blades of the auger or screw type may also be employed. The spiral slots 22 in the shaft 17 are preferably aligned with the spiral positioning of the reel-type blades 16 on the shaft 17, as shown in FIG. 1. The specific size of the slots 21, 22 is determined by the volume of the particular filter separator and also the type of sludge being processed. An angle of spiral of about 20° is advantageously employed for the blades 16 and slots 22, but this angle can be varied between 0° and 45°, if needed.

As shown in FIGS. 3, 8 and 9, a valve handle 23 is formed integrally with the tubular valve bearing shaft 19 and serves to position the shaft 19 to allow alignment of the vertical slots 21 in shaft 19 relative to the vertical slots 21 in the tubular central solids discharge shaft 20, employing means such as scribe marks to indicate that the slots 21 of the two shafts 19, 20 are aligned. A valve lock is mounted on the shaft 19 to control the fixed positioning of the bearing shaft 19 for alignment of the vertical slots in the open or closed position. As shown in FIGS. 8 and 9, the mechanism includes a pair of lock-pin receptacles 24 which are fixed to shaft 19 in horizontal alignment, 45° apart. One receptacle is marked "open" and the other is marked "closed". A spring-loaded lock pin unit 47 is fixed to shaft 20. Rotation of shaft 19 by use of valve handle 23 allows the spring-loaded pin 47 to seat in the open or closed position to achieve the desired setting. A discharge valve 25 mounted on discharge shaft 20 beneath the shell 11 serves to control the flow of dry solids expelled through the central solids dischage shaft 20, as shown in FIG. 3.

As the wiper blades 16 rotate, solid materials which have collected in the central portion of the apparatus 10 are forced inwardly around the wiper blade shaft 17 and through the spiral slots 22 cut therein. The rotation of the shaft 17 results in the intermittent formation of escape ports, moving from the top to the bottom of the spiral slots 22, as portions of these spiral slots 22 become momentarily aligned with the vertical slots 21 in the valve bearing shaft 19 and discharge shaft 20, the slots 21 in shafts 19 and 20 having been previously brought into various degrees of alignment with each other by operation of the valve handle 23. The solid materials from the feed are thus permitted to pass inwardly under pressure through the controlled valve action created by various degrees of alignment of the slots 21 and 22. In the embodiment of FIG. 1, the slots 21 and 22 are shown as being of equal length and width; however, the width of the opening created by the degree of alignment of the slots creates a controlled escape port to operate in conjunction with the intermittently formed escape ports which move from the top to the bottom of spiral slots 22 as the wiper blade shaft 17 rotates. The solid materials are subsequently expelled through the central solids discharge shaft 20 via discharge valve 25. In this way, dewatered solids or sludge may be removed at varied desired rates and compositions.

In operation, a precoat slurry is fed, preferably as a homogeneous mixture, into the interior of the filter separator 10 at the top through the entrance feed pipe 27. Generally, the precoat slurry is introduced into the filter separator 10 at a pressure in the range of about 20 to 40 psi. Any suitable precoat material such as diatomaceous earth, clay, cement dust, ash or other material possessing good filtering qualities may be employed. The precoat material should have a large enough particle size that the precoat will be retained by the particular filter media which is employed. The precoat is introduced into the interior of the shell 11, passes through the inner perforated sleeve 12 and collects on the inner side of the filter media 15, filling the precoat chamber 14 until it is flush with the inner surface of the inner perforated sleeve 12. The perforations 29 in the inner perforated sleeve 12 are also filled with precoat material, creating a solid surface on the interior of the inner perforated sleeve 12, as shown in FIG. 4.

A material to be filtered such a sludge, either treated or non-treated, is introduced through feed pipe 27 immediately following the precoat slurry at the same pressure, at which time the wiper blades 16 are activated and the feed pressure is increased as necessary to accommodate the specific sludge being processed. Due to the particular construction of the present apparatus, high feed pressures may be advantageously employed, and pressures of 5 to 250 psi are commonly employed in the filter separator of the present invention. As the wiper blades 16 rotate in close proximity to the inner perforated sleeve 12, this action of the wiper blades 16 causes the solid particles of the sludge which continuously collect on the interior of the inner perforated sleeve 12 to be wiped away and separated from the inner sleeve 12 and forced around and into the interior of the wiper-blade shaft 17 through slots 22.

When desired amounts of solids are collected around the wiper blade shaft 17, the tubular valve bearing shaft 19 is rotated to a pre-determined point by the use of the valve handle 23, aligning the vertical slots 21 with the vertical slots 21 in the central solids discharge shaft 20 to the degree of opening desired. The shaft 19 is then locked in position by adjusting valve lock 47. The rotation of the wiper blade shaft 17 over the tubular valve bearing shaft 19, after the alignment of the vertical slots 21, will force the pressurized solids through the spiral slots 22 in the wiper blade shaft 17 from top to bottom as the shaft 17 rotates, allowing the solids to be forced into the central solids discharge shaft 20 and out the bottom of the shaft 20 through the discharge valve 25 located at the bottom of the filter separator 10. A vacuum source (not shown) is applied as necessary to assist in removing solids through the lower end of the shaft. When vacuum is applied, the relief valve 18 is adjusted as necessary to relieve suction.

Precoat contained in the precoat chamber 14 is not disturbed or removed during rotation of the wiper blades 16. By this action, therefore, it is impossible to blind the filter media 15. Blinding of media has occurred in prior art filter devices as a result of the media being touched or wiped, forcing solid particles into the pores of the filter media so as to cause the particles to lodge, creating a solid surface and thus restricting or stopping filtration. Such disadvantages are effectively overcome by the present filter separator 10.

Filtrate is allowed to escape through the perforations 29 in the inner sleeve 12, then in sequence through precoat material trapped in the precoat chamber 14, then through filter media 15 and the perforations 29 in the outer perforated sleeve 13, after which the filtrate is collected in the filtrate collection chamber 28 from which the clean filtrate is piped off through exit pipes 46.

The differential pressure applied to the interior of the filter separator 10 is such that the pressure in the central portion of the separator 10 is at least greater than the pressure in the filtrate chamber 28, thereby causing the filtrate to be extracted from within the central portion of the filter separator 10 through to the filtrate chamber 28.

A unique feature of the present invention is embodied in the function of the wiper blades 16 moving 360° across the entire interior surface of the inner perforated sleeve 12 and at no time coming in contact with the filter media 15 or disturbing the captured precoat material. This arrangement of components ensures that the filter media 15, being touched by no moving part, is protected from any wiping or blinding action that could inhibit filtration or the efficiency of the filtering process.

The apparatus and method of the present invention are applicable to any continuous method of vacuum and/or pressure filtration, as distinguished from batch type filters such as plate and fram filter presses. Also, the present invention may be operated at any desired angle of the concentric filtering means, i.e., the apparatus may be either upright, at an angle or on its side.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely the preferred embodiments thereof.

It is claimed:

1. A filter separator for continuously filtering a liquid-solid feed material, comprising: a cylindrical chamber having enclosing top, bottom and side walls; an inner and an outer perforated cylindrical sleeve, said sleeves being mounted coaxially within said chamber in a spaced relationship; a filter media attached to and extending around the entire inner surface of said outer sleeve, said filter media being of a thickness such that a space remains between the filter media and the inner sleeve; a volume of precoat material in said space between the filter media and the inner sleeve, said precoat material being collected on the inner side of the filter media and filling said space and the perforations in the inner sleeve; a first spirally-slotted hollow shaft rotatably mounted coaxially within said chamber, said first shaft having at least one spirally-slotted portion for passage of solid filtered material; a wiper blade assembly having at least on wiper blade mounted on said first shaft, said wiper blade extending in a spiral around said first shaft and being of a size and construction sufficient to constantly move collected solid material off of the interior surface of the inner perforated cylindrical sleeve; means for rotating said first spirally-slotted hollow shaft and wiper blade assembly; inlet means for feeding liquid-solid feed material under pressure into the central portion of said chamber interiorly of said cylindrical sleeves; means for removing solid filtered material from the interior of said first hollow shaft; and an outlet located on the periphery of said chamber for removal of liquid filtrate which collects between the outer sleeve and the side walls of the chamber.

2. The filter separator of claim 1, wherein said means for removing solid filtered material includes a pair of concentric hollow shafts coaxially mounted within said first hollow shaft, each shaft of said pair of shafts being provided with at least one vertical slot; means for adjusting the alignment of the vertical slots of said pair of shafts; at least one spiral-shaped slotted portion of said first hollow shaft being aligned with said blade, said spiral-shaped slotted portion being intermittently aligned with the vertical slots of said pair of shafts during rotation of said first hollow shaft.

3. In an apparatus for adjusting the flow of removal of solid filtered material from a cylindrical filter separator, the improvement comprising: a first hollow shaft rotatably mounted coaxially within said separator, said first shaft having at least one spiral shaped slotted portion for passage of solid filtered material into a valve unit constructed to control the flow of solid filtered material by the interaction of the valve unit with the slotted portion of the first hollow spirally-slotted shaft; said valve unit including a pair of concentric hollow shafts coaxially mounted within said first spirally-slotted hollow shaft, the inner shaft of said pair of concentric hollow shafts being stationary and the outer shaft of said pair of concentric hollow shafts being rotatably adjustable; each shaft of said pair of concentric hollow shafts being provided with at least one vertical slot, the spiral-shaped slotted portion of said first shaft being intermittently aligned, from the top to the bottom, with the vertical slots of said pair of concentric hollow shafts during rotation of said first spirally-slotted shaft; and means for adjusting the alignment of the outer shaft of said pair of shafts relative to the stationary inner shaft of said pair of shafts to create an adjustable escape port of varying sizes by alignment of the vertical slot in the outer adjustable shaft of the pair of shafts with the vertical slot in the stationary inner shaft of the pair of shafts to control the flow of solid filtered material into the interior of the stationary inner shaft, said inner shaft acting as the exit port of solid filtered material from the filter separator.

4. A method for continuously filtering a liquid-solid feed material, comprising:
   a. passing precoat material under pressure into a chamber having an inner and outer perforated cylindrical sleeve mounted therein in a spaced relationship and a filter media attached to the inner surface of said outer sleeve, said precoat material having a particle size large enough that the precoat is retained by the filter media;
   b. collecting said precoat material upon the filter media so that said precoat fills the space between the filter media and the inner surface of the inner sleeve;
   c. passing a liquid-solid feed material under pressure into the central portion of said chamber interiorly of said cylindrical sleeves;
   d. rotating a wiper blade assembly having at least one wiper blade attached to a first spirally-slotted hollow shaft rotatably mounted coaxially within said chamber, said wiper blade extending in a spiral around said first shaft and acting to constantly move collected solid material off of the interior surface of said inner sleeve, said first hollow shaft having at least one spirally- slotted portion for passage of solid material;
   e. removing the solid material which collects on the interior of said inner sleeve; and
   f. removing the liquid filtrate which collects between the outer sleeve and the walls of the chamber.

5. The method of claim 4, wherein a pair of concentric hollow shafts are coaxially mounted within said first hollow shaft each shaft of said pair of shafts being provided with at least one slotted portion, the slotted portion of said first hollow shaft being intermittently aligned with the slotted portions of said pair of shafts during rotation of said first hollow shaft, and wherein said slotted portions of said pair of shafts are aligned when it is desired to remove solid filtered material from the chamber.

6. The method of claim 5, wherein at least one spirally- slotted portion of said first hollow shaft is aligned with said blade, and wherein the slotted portions of said pair of shafts are vertical.

7. The method of claim 4, wherein the precoat material and the feed material are passed into the chamber at a pressure of about 20 to 40 psi.

8. In a filter separator for continuously filtering a liquid-solid feed material, wherein the feed material passes outwardly from the center of the filter separator through an inner and outer perforated sleeve, said sleeves being mounted within said filter separator in a spaced relationship, and wherein a wiper blade assembly is employed interiorly of said inner sleeve to constantly move collected solid material off the interior surface of the inner sleeve, the improvement comprising: a filter media attached to and extending around the entire inner surface of said outer sleeve, said filter media being of a thickness such that a space remains between the filter media and the inner sleeve; the size of the perforations in said inner and outer sleeve being from about 1/32 to 3/16 inch in diameter; and a volume of precoat material in said space between the filter media and the inner sleeve, said precoat material being collected on the inner side of the filter media and completely filling said space and the perforations in the inner sleeve; said filter media having openings therein which are sufficiently small to prevent precoat material from passing through the openings; and wherein said wiper blade is freely rotatable inside said inner sleeve with a clearance being provided between said wiper blade and said inner sleeve; said improvement acting to enhance the continuous operation of said filter separator by preserving the precoat on the inner side of the filter media and preventing the blinding of the filter media.

* * * * *